US010210749B1

United States Patent
Wisniewski et al.

(10) Patent No.: US 10,210,749 B1
(45) Date of Patent: Feb. 19, 2019

(54) REMOTE CONTROL SYSTEM

(71) Applicant: Monterey Research, LLC, Santa Clara, CA (US)

(72) Inventors: John Anthony Wisniewski, Plymouth Meeting, PA (US); Kristopher L. Young, Atlanta, GA (US); David G. Wright, Woodinville, WA (US)

(73) Assignee: Monterey Research, LLC, Santa Clara, CA (US)

( * ) Notice: Subject to any disclaimer, the term of this patent is extended or adjusted under 35 U.S.C. 154(b) by 0 days.

(21) Appl. No.: 15/190,416

(22) Filed: Jun. 23, 2016

Related U.S. Application Data

(63) Continuation of application No. 13/243,987, filed on Sep. 23, 2011, now Pat. No. 9,380,248, which is a continuation of application No. 11/344,745, filed on Jan. 31, 2006, now Pat. No. 9,031,270.

(51) Int. Cl.
*H04N 5/44* (2011.01)
*G08C 17/02* (2006.01)
*H04N 21/422* (2011.01)

(52) U.S. Cl.
CPC ....... *G08C 17/02* (2013.01); *H04N 21/42207* (2013.01); *H04N 21/42225* (2013.01); *G08C 2201/92* (2013.01)

(58) Field of Classification Search
CPC ....... H04N 21/42207; H04N 21/42225; G08C 17/02; G08C 2201/92
USPC ....................................................... 348/734
See application file for complete search history.

(56) References Cited

U.S. PATENT DOCUMENTS

| | | | |
|---|---|---|---|
| 5,614,906 A | 3/1997 | Hayes et al. | |
| 7,376,590 B2 * | 5/2008 | Lee | G06Q 30/0601 348/E5.103 |
| 2002/0137460 A1 * | 9/2002 | Sun | G07C 9/00857 455/41.2 |
| 2002/0140855 A1 | 10/2002 | Hayes et al. | |
| 2003/0103088 A1 | 6/2003 | Dresti et al. | |
| 2003/0141987 A1 * | 7/2003 | Hayes | G08C 19/28 340/12.25 |
| 2004/0041712 A1 | 3/2004 | Collovini et al. | |
| 2013/0171981 A1 * | 7/2013 | Woo | G08C 17/02 455/420 |

OTHER PUBLICATIONS

USPTO Advisory Action for U.S. Appl. No. 11/344,745 dated Apr. 11, 2011; 2 pages.
USPTO Advisory Action for U.S. Appl. No. 13/243,987 dated Jan. 15, 2015; 3 pages.
USPTO Advisory Action for U.S. Appl. No. 13/243,987 dated Jun. 13, 2014; 2 pages.

(Continued)

*Primary Examiner* — Michael Lee
(74) *Attorney, Agent, or Firm* — Kunzler, PC

(57) ABSTRACT

A method and apparatus receive first control data associated with a first device, using a radio frequency transceiver and store the first control data in a memory. The method and apparatus detect selection of an operational function of the first device through an interface and use a processor to access the memory for control data corresponding to the operational function. The method and apparatus transmit the control data corresponding to the operational function to control the first device.

19 Claims, 3 Drawing Sheets

(56) References Cited

OTHER PUBLICATIONS

USPTO Advisory Action for U.S. Appl. No. 13/243,987 dated Nov. 20, 2013; 2 pages.
USPTO Final Rejection for U.S. Appl. No. 11/344,745 dated Feb. 2, 2011; 6 pages.
USPTO Final Rejection for U.S. Appl. No. 11/344,745 dated May 18, 2010; 5 pages.
USPTO Final Rejection for U.S. Appl. No. 13/243,987 dated Mar. 25, 2015; 9 pages.
USPTO Final Rejection for U.S. Appl. No. 13/243,987 dated Apr. 14, 2014; 8 pages.
USPTO Final Rejection for U.S. Appl. No. 13/243,987 dated Sep. 9, 2013; 7 pages.
USPTO Final Rejection for U.S. Appl. No. 13/243,987 dated Oct. 16, 2014; 9 pages.
USPTO Non-Final Rejection for U.S. Appl. No. 11/344,745 dated Nov. 9, 2009; 4 pages.
USPTO Non-Final Rejection for U.S. Appl. No. 13/243,987 dated Jun. 4, 2013; 6 pages.
USPTO Non-Final Rejection for U.S. Appl. No. 13/243,987 dated Jul. 16, 2015; 9 pages.
USPTO Non-Final Rejection for U.S. Appl. No. 13/243,987 dated Jul. 29, 2014; 7 pages.
USPTO Non-Final Rejection for U.S. Appl. No. 13/243,987 dated Dec. 26, 2013; 7 pages.
USPTO Notice of Allowance for U.S. Appl. No. 11/344,745 dated May 26, 2011; 5 pages.
USPTO Notice of Allowance for U.S. Appl. No. 13/243,987 dated Feb. 18, 2016; 5 pages.

* cited by examiner

REMOTE CONTROL SYSTEM

CROSS-REFERENCE TO RELATED APPLICATIONS

This application is a continuation of U.S. patent application Ser. No. 13/243,987, filed Sep. 23, 2011, which is a Continuation of U.S. application Ser. No. 11/344,745, filed Jan. 31, 2006, now U.S. Pat. No. 8,031,270, all of which are incorporated by reference herein in their entirety.

TECHNICAL FIELD

The invention relates generally to remote controls and, in particular, to a dual mode infrared and radio frequency remote control system.

BACKGROUND OF THE INVENTION

Traditional remote control devices for Audio/Visual (AV) devices, such as televisions (TVs), receivers, tuners, amplifiers, video cassette recorders (VCRs), digital video disc (DVD) players, etc., use infrared (IR) light to communicate simple commands to the devices being controlled. There are few standards for remote control IR signaling, modulation, or protocols, and those standards that do exist are not widely used. As a result, separate remote controls may be required for the TV, VCR, DVD player, receiver, and Set-Top Box (STB) found in a typical living or family room. This is clearly cumbersome and results in clutter—in this case, five remote controls on the coffee table.

In an attempt to ameliorate this situation, "universal" and "learning" remote controls have been developed. A number of suppliers have researched the IR signaling, modulation, protocols, and commands used by almost every AV product made in recent years and created a compressed format for storing all of the IR information in a database. A universal remote control stores the entire database (or perhaps a subset representing the most common AV devices in a particular market) of IR information and allows the user to program the universal remote control to control all the AV devices in a room. A simple remote control designed to control only one specific AV product can be implemented using a very low cost 4- or 8-bit microcontroller unit (MCU) with as little as one kilobyte (1 kB) of read-only memory (ROM). A universal remote control, however, requires an MCU with 24-48 kB of ROM, depending on how comprehensive the library is. This substantially increases the cost of the universal remote control.

A learning remote control takes a different approach. Rather than storing an entire database of codes, a learning remote control has an IR receiver. The learning remote control can receive the IR signals sent by another IR remote control. Thus, the learning remote control can be programmed to "learn" the IR commands sent by another IR remote control and control any or all of the AV devices in a system controlled by another IR remote control.

In practice, many universal remote controls also include a learning feature. These universal remote controls typically include a subset of the full code library to allow programming the most common devices; less common devices can be controlled using the learning feature of the universal remote control.

One very significant drawback of both universal and learning remote controls is the difficulty of programming them. Hence, a user must refer to an instruction manual for programming instructions. Although a remote control has many buttons, the only commonly available method of user feedback is a single light-emitting diode (LED). A typical programming sequence for a universal remote control comprises the following steps:

1. The user presses 1 or a device mode button for several seconds. Typically, a universal remote control includes a plurality of device mode buttons (e.g., CABLE, TV, VCR and OTHER) corresponding to the different AV devices to be controlled. To program the universal remote control to control a TV, for example, the user presses the TV button on the remote control.
2. The LED starts blinking to indicate programming mode.
3. To determine the IR code required to program the universal remote control to control the user's TV, the user refers to a large table of AV Products in the instruction manual. The IR code table, often comprising many pages, provides a listing of TV manufacturers, model numbers, and a 3- to 6-digit number.
4. The user enters the 3- to 6-digit number.
5. The user repeats steps (1)-(4) for each AV device to be controlled by the universal remote control.
6. The user presses 1 or the device mode button for several seconds.
7. The LED stops blinking to indicate that programming is complete.

Programming a learning remote control is even more complex. The procedure for entering learning mode typically comprises the same steps as that described above for entering programming mode. The user must position the remote control being learned from (the "teaching" remote control) in front of the remote control being taught (the learning remote control) so that the teaching remote control's IR transmitter is directly facing the learning remote control's IR receiver. The user then presses the VOLUME UP button, for example, on the learning remote control, followed by pressing the VOLUME UP button on the teaching remote control. When the learning remote control has received the signals from the teaching remote control, the LED on the learning remote control may blink to indicate to the user that the learning operation for that button has been completed. This process is then repeated for every button that is to be learned. In some cases, if the learning remote control supports multiple AV devices on the same button (e.g., the same PLAY button supports either a DVD or a VCR), then the whole process will be repeated for each AV device in the system, so that the PLAY button will issue a different IR signal depending on whether the DVD or the VCR is selected.

Clearly, these programming processes are not user-friendly. They are time consuming, confusing, and rely on having the instruction manual in hand. As a result, many users do not bother to program their universal remote controls; and many of those who bother, program only a few main features (e.g., PLAY, STOP, VOLUME UP, ENTER CHANNEL) rather than the full control set for every device.

IR is far from an ideal means of controlling AV devices. A positive feature of IR is its very low cost. However, one drawback is that IR requires line of sight between the remote control and the device being controlled. Thus, an IR remote control cannot be used to control devices inside a cabinet with a closed non-glass door. It also places limitations on the positioning of the user's furniture relative to the sitting/viewing position and the location of the equipment, as IR requires that there be no obstruction between the remote control and the device being controlled. Many IR remotes also have distance limitations such that you often can not control things from across a large room. Another drawback is that IR requires large batteries, as the IR LED used to transmit is typically driven with up to 1 A of current. In addition, the data rate is very slow—so slow that even button presses (a few Hz at most) incur a noticeable delay if a number of the button presses are sent consecutively, for example, when pressing VOLUME UP, VOLUME UP, . . . , VOLUME UP to increase the volume to a desired level.

A radio frequency (RF) remote control would be desirable. No line of sight would be required, a greater distance could be covered, much smaller batteries could be used, and more interactive features could be supported (for example, a mouse-like cursor control feature for more sophisticated AV applications). For these reasons and others, RF remote controls have begun to increase in popularity. However, one disadvantage of an RF remote control is that it cannot be a "universal" or "learning" remote control.

Today, the most common RF remote controls are supplied with Cable, Satellite, Digital Terrestrial or Internet Protocol TV (IPTV) Set-Top Boxes. Many STB suppliers would like to offer dual mode RF and IR remote controls, allowing users to have "the best of both worlds." Such dual mode remote control would have been prohibitively expensive until recently, when the only low cost (less than 1) RF technologies were very simple one-way systems using unlicensed RF bands such as 49 and 433 MHz. These RF technologies were very low data rate (typically, less than 10 kbps) and were not available worldwide, but had relatively good range. In recent years, following the worldwide adoption of a 2.4 GHz unlicensed band, a number of very low cost, two-way, highly integrated radio integrated circuits (ICs) have become available, offering medium range and supporting data rates of up to 1 Mbps.

Thus, a low-cost dual mode IR and RF remote control that greatly simplifies programming the "learning" and "universal" capabilities is desirable.

SUMMARY OF THE INVENTION

An improved remote control system comprises a remote control to control a plurality of devices using a first communication link, for example, an infrared (IR) link and a host device to configure the remote control. The host device transmits to and receives data from the remote control using a second communications link, for example, a radio frequency (RF) link. The remote control receives command information from the host device. The command information includes control codes and signaling protocols used by remotely controlled devices in the market. The command information may be stored in memory in the host device, or the host device may retrieve the command information from a remote database. The host device may also comprise a receiver to receive signals from remote control transmitters supplied with the devices to be controlled by the remote control.

BRIEF DESCRIPTION OF THE DRAWINGS

The above and other features and advantages of embodiments of the invention will become readily apparent by reference to the following detailed description when considered in conjunction with the accompanying drawings.

DETAILED DESCRIPTION

The invention as described below may be embodied in many different forms and should not be construed as limited to the embodiments set forth herein. Rather, these embodiments are provided so that this disclosure will be thorough and complete and will fully convey the scope of the invention to those skilled in the art.

Figure 1:
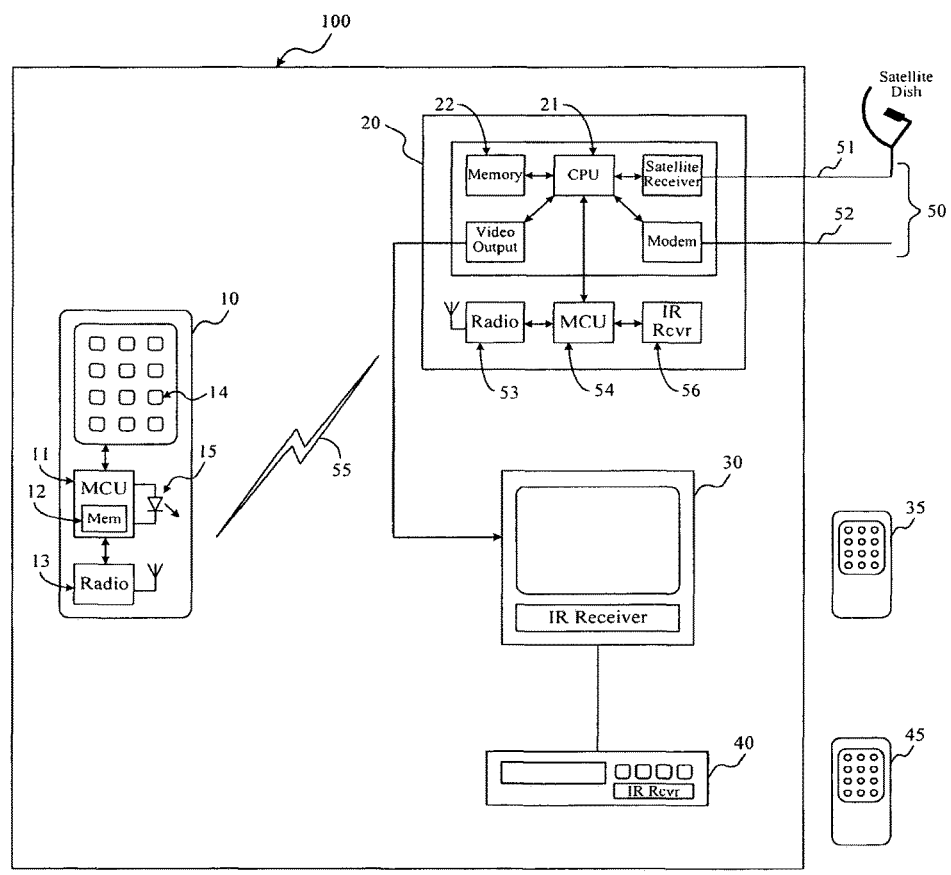
FIG. 1 shows an exemplary embodiment of a remote control system.

FIG. 1 shows one embodiment of an improved remote control system 100. The remote control system 100 comprises a Remote Control 10, a host device 20 with a two-way communications link 50 to transmit and receive signals from an external source, and one or more Audio/Visual (AV) devices which may be controlled by an IR remote control 35, 45 supplied with the AV devices. The remotely controlled AV devices may include a TV 30, a DVD player 40, and other devices such as a receiver, a VCR, etc. The two-way communications link 50 may be a single bidirectional link, such as an Internet connection or a digital cable TV connection, or two unrelated communications paths, such as a satellite receiver link 51 and a telephone line 52.

In the embodiment shown in FIG. 1, the Remote Control 10 is a remote control device supplied with the host device 20. The Remote Control 10 may be a remote control supplied with a Set-Top Box (STB), for example, a satellite, cable, or Internet Protocol TV (IPTV) STB. In other embodiments, the Remote Control 10 may also be implemented in remote control devices supplied with AV devices or other devices with an IR remote control such as ceiling fans, blinds, or light fixtures.

The Remote Control 10 comprises a processing element 11, a memory 12, a bidirectional wireless communication device 13, a plurality of buttons 14, and an IR transmitter 15. The processing element 11 may be implemented in a microcontroller unit (MCU). The memory 12 may include Random Access Memory (RAM), Flash memory, Electrically Erasable Programmable Read Only Memory (EEPROM), hard disk drive, etc. In the embodiment shown in FIG. 1, the bidirectional wireless communications device 13 includes a radio transceiver, allowing the Remote Control 10 to communicate with the host device 20 using a bidirectional RF link 55. However, the bidirectional link 55 may include any two-way communications link, including IR, ultrasonic, or even a wired connection.

The host device 20 of the remote control system 100 provides a main function in addition to programming the Remote Control 10. For example, the host device 20 in FIG. 1 comprises a Set-Top Box (STB) for receiving television signals, decoding the signals, and outputting video signals to the TV 30. The host device 20 includes a central processing unit (CPU) 21 and rewritable non-volatile data storage means 22. The storage means 22 provides program storage for the CPU and may include Flash memory, EEPROM, or a hard disk drive. The storage means 22 may also contain an IR remote control code library. The host device 20 further includes the bidirectional data link 55 to the Remote Control 10. The data link 55 may be implemented in the host device 20 as a transceiver 53 and a processing element 54 dedicated to managing the bidirectional data link 55, the processing element 54 exchanging data with the CPU 21. In another embodiment, the data link 55 may be implemented as a transceiver 53 controlled by the CPU 21. Optionally, the host device 20 may also comprise an IR receiver 56.

As supplied ("out of the box"), the Remote Control 10 and the STB 20 are configured such that when a button 14 is pressed on the Remote Control 10, the Remote Control 10 sends RF commands to the STB 20. For example, pressing the 1, 2, and 3 buttons on the Remote Control 10 causes the MCU 11 in the Remote Control 10 to send one or more RF packets to the STB 20, which then causes the STB 20 to tune to channel 123 and output a video signal to the TV 30. The TV 30 then displays the television station that corresponds to channel 123 on the Satellite, Cable, or IPTV system.

Figure 2:
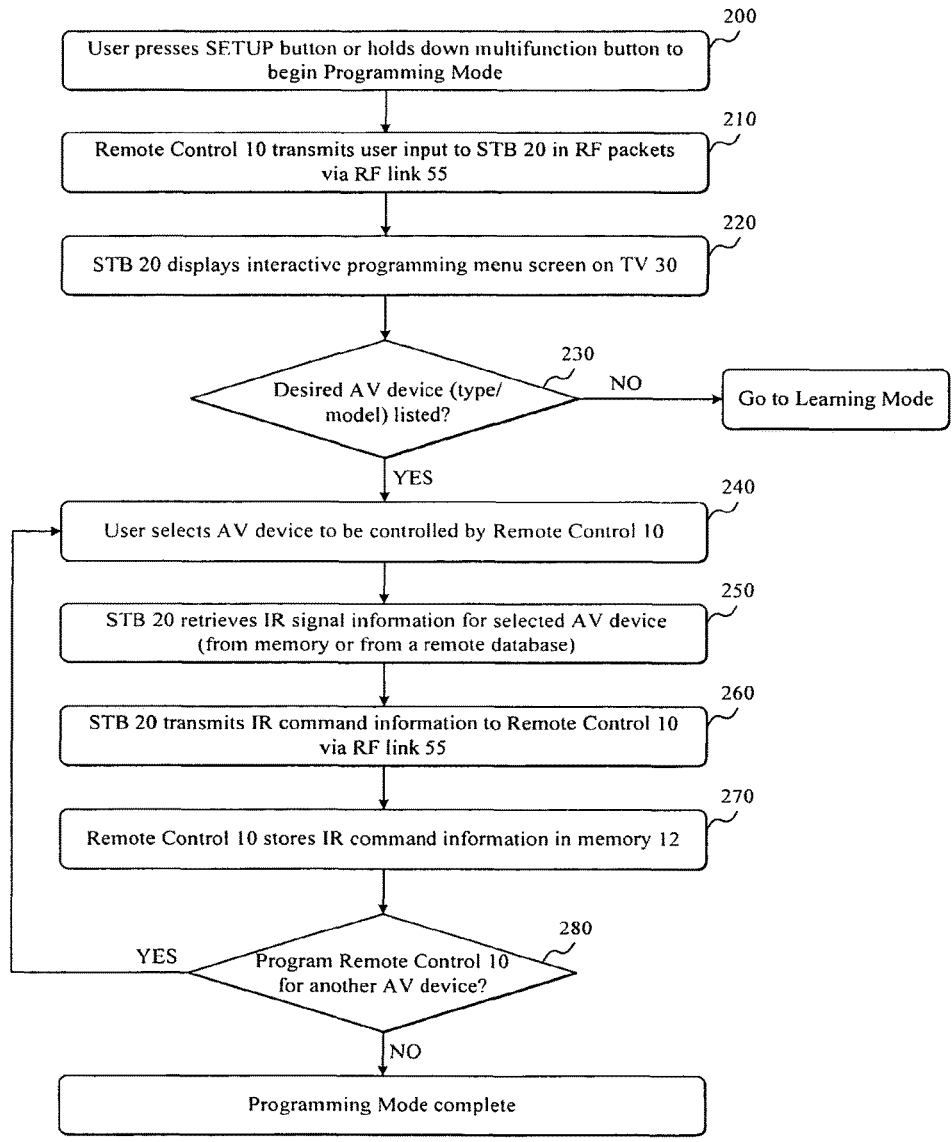
FIG. 2 shows a flowchart of the programming operation for the remote control system in FIG. 1.

FIG. 2 shows in flowchart form the programming operation of the remote control system 100 in FIG. 1. A user may configure the Remote Control 10 to control an AV device using the AV device's IR remote control signals. In block 200, the user presses either a specific SETUP button on the Remote Control 10, or the user holds down a multifunction button for an extended time (for example, 5 seconds). In block 210, the Remote Control 10 then sends one or more RF packets to the STB 20 indicating that the user wishes to program the Remote Control 10. In block 220, the STB 20 then displays an interactive programming menu screen on the TV 30. In one embodiment, the menu screen may contain instructions and a list of device types. The list of device types may include TV, VCR, DVD player, CD player, Receiver, Tuner, PVR, etc. For example, to configure the Remote Control 10 to control the TV 30, the user selects the TV option from the menu list using the UP and DOWN arrow buttons and then presses the ENTER button on the Remote Control 10. The STB 20 then displays a menu list of TV vendors—for example, Sony, Panasonic, BenQ, etc.—including an OTHER and/or MORE OPTIONS menu options. If, in block 230, the TV 30 is made by one of the vendors on the list, the user would select that vendor from the menu in block 240. The STB 20 would then display a list of TV models from that vendor. The list of models may be formatted as a single long list of models or as a tiered menu list. In a tiered menu list, a first tier list may appear as a list of TV screen sizes, for example, "22-inch, 22-inch-27-inch, 27-inch, etc.," followed by a sub-menu list of TV model numbers for each of the options provided in the first tier. When the user selects the TV model number from the menu, in block 250, the STB 20 then retrieves the details of the IR signals required to be transmitted for each function in order to control the TV 30. In block 260, the STB 20 then sends the IR command information to the Remote Control 10 via the RF link 55. In block 270, the Remote Control 10 then stores the IR command information in memory 12.

Thereafter, when the user presses the TV button on the Remote Control 10, any subsequent button presses causes the MCU 11 in the Remote Control 10 to access the IR command information stored in memory 12 and send the appropriate signals using the IR transmitter 15 in the Remote Control 10. For example, if the user presses the TV button followed by the VOLUME UP button, the MCU 11 finds the IR command information in memory 12 corresponding to "increment volume" and sends that IR command Thus, the Remote Control 10 will send IR signals to the TV 30 that are functionally equivalent to the IR signals that would be transmitted by the remote control 35 originally supplied with the TV 30 when the VOLUME UP button was pressed on the remote control 35.

In block 280, the user may then continue programming the Remote Control 10 to control other AV devices, for example, a DVD player 40, by means of the interactive menu system on the STB 20.

Figure 3:
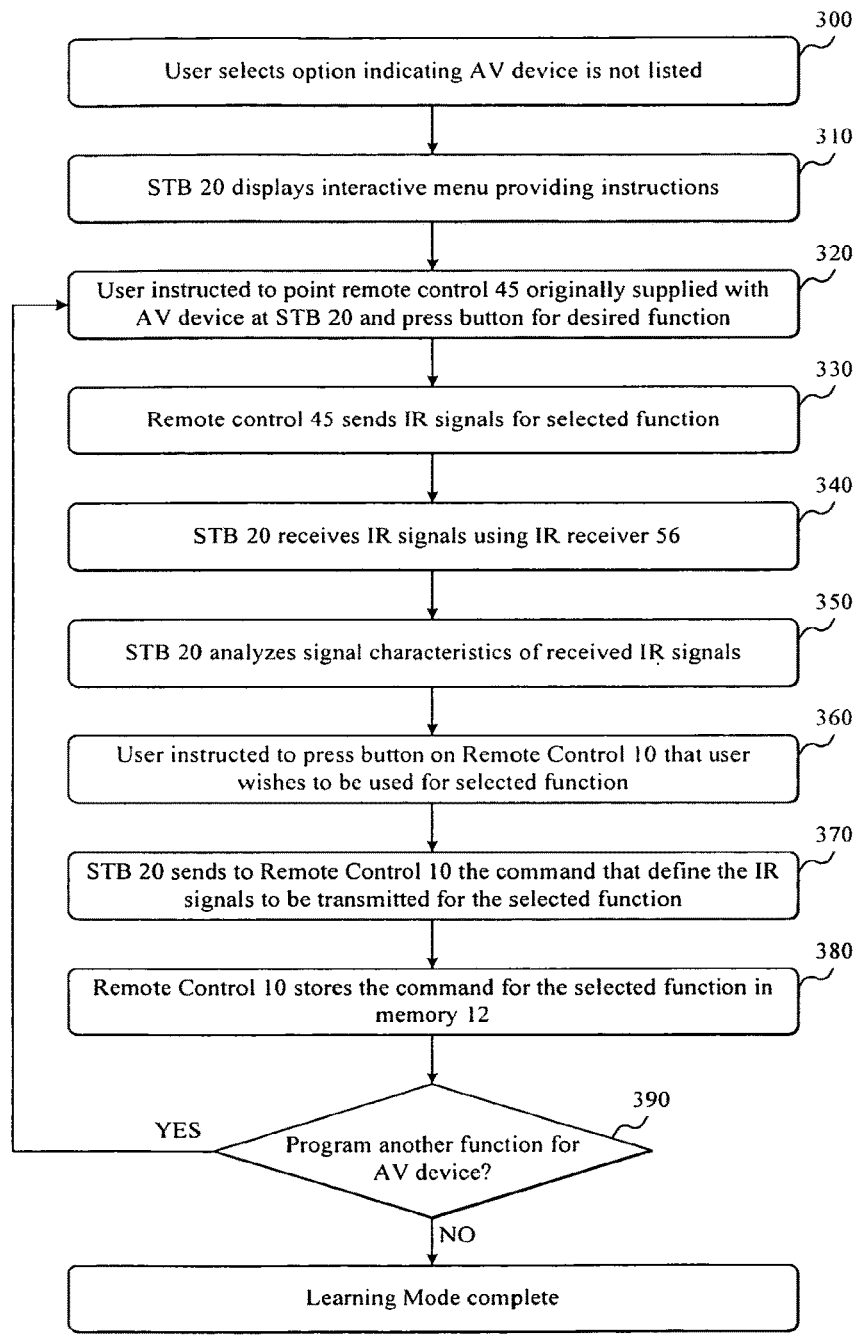
FIG. 3 shows a flowchart of the learning mode operation of the remote control system in FIG. 1.

FIG. 3 shows a flowchart of the learning mode operation of the remote control system 100 in FIG. 1. In some cases, the database stored in the STB 20 may not include the IR command information for the AV device that the user wishes to program. For example, the user may want to configure the Remote Control 10 to control the DVD player 40. If the DVD player 40 is not included in the menu list (FIG. 2, block 230), then the remote control system 100 enters the learning mode and provides instructions to "teach" the Remote Control 10 to control the DVD player 40. In block 300, the user selects an option labeled, for example, "My DVD player is not listed." In block 310, the STB 20 then takes the user to another interactive menu system to access the "learning" functions of the remote control system 100. The STB 20 displays instructions on the TV 30 guiding the user through the learning process. For example, the user may want to teach the Remote Control 10 to control the FFWD function of the DVD player 40. In block 320, the user receives instructions to point the remote control 45 originally supplied with the DVD player 40 at the STB 20 and press the FFWD button on that remote control 45. This causes, in block 330, the DVD player remote control 45 to send the IR signals that the DVD player 40 interprets to mean "Fast Forward." In block 340, the STB 20 receives the IR signals using the IR receiver 56. In block 350, the STB 20 then analyzes the IR signals to determine the signal characteristics including the carrier frequency, the type of modulation (On/Off Key modulation, Pulse Width Modulation, etc.), and the underlying data encoded in the transmission. In block 360, the STB 20 then displays instructions on the TV 30 instructing the user to press the button on the Remote Control 10 that the user wishes to be used to send the FFWD command to the DVD player 40. In block 370, the STB 20 then sends to the Remote Control 10, via the RF data link 55, the command that defines the IR signals to be transmitted by the Remote Control 10 to control the FFWD function in the DVD player 40. In block 380, the MCU 11 in the Remote Control 10 stores the command in memory 12. In block 390, the STB 20 displays further instructions on the TV 30, asking the user if "learning" is complete or if another button on the Remote Control 10 is to be programmed. This "teaching" process continues until the user has programmed all of the DVD player functions that the user wishes to control using the Remote Control 10.

A further feature of the remote control system 100 includes online updating of the IR signal/code library. Referring back to FIG. 1, the host device 20 (the STB) includes a two-way communications link 50 to transmit and receive signals from an external source. Using communications link 50, the STB 20 may communicate with a remote computer comprising a master library of the IR signals/codes. The STB 20 may then periodically receive updates to the IR signal/code library stored in memory 22 from the remote computer each time the master library is updated to support new devices or may access this database upon receiving a "My DVD (or similar) not listed". Thus, if the user buys a new AV component only recently brought to market, the library stored in memory 22 of the STB 20 may be updated to support that new AV component. The user will be able to take full advantage of the "universal" Remote Control 10 that would not have been possible with the conventional solution.

Another feature of the remote control system 100 includes an improved method of performing firmware updates. Unfortunately, early releases of many consumer electronic products incorporating a processing element and firmware and/or software typically have a "bug" in that firmware. Due to the complexity of the firmware and/or the very wide variety of possible usage scenarios, it may be impractical to test every possible combination prior to bringing a product to market. Thus, firmware updates are a common occurrence. In the conventional solution, the STB manufacturer may ship a newer revision of the remote control incorporating the upgraded firmware to the user. This solution may be costly for the manufacturer and unsatisfactory for the user. The remote control system 100 offers an improved solution. Using the two-way communications link 50, an STB manufacturer may transmit firmware upgrades to the STB 20. Using the RF link 55, the revised firmware may then be uploaded from the STB 20 to the memory 12 of the Remote Control 10 either automatically or in response to a user action through a HELP menu displayed on the TV 30 by the STB 20.

As described above, the IR signal/code library may be stored in memory 22 on the STB 20. In another embodiment of the remote control system 100, the library is not stored in the STB 20. Rather, the library may be stored in a remote computer (not shown) and accessed by the STB 20 through the data link 50 only when the user programs the Remote Control 10. This embodiment may provide advantages for the owners of the library. Providing the entire library, which may represent valuable intellectual property (IP), in a product may leave the library open to "hacking" by an IP thief. Maintaining control over the library may provide the owners of the library a level of security. This embodiment may also provide an alternative business model for the owners of the IR signal/code library. For example, the owners of the library may charge the STB vendor a fee each time the database is accessed by the user. Thus, this business model may provide a constant stream of revenue for the owners of the library, rather than a one-time licensing fee. The STB vendor may also benefit from this business model, which may reduce the upfront cost of building an STB.

The system described above can use dedicated processor systems, microcontrollers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

It should be appreciated that reference throughout this specification to "one embodiment" or "an embodiment" means that a particular feature, structure, or characteristic described in connection with the embodiment is included in at least one embodiment of the invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Having described exemplary embodiments of the invention, it is noted that modifications and variations can be made by persons skilled in the art in light of the above teachings. Therefore, it is to be understood that changes may be made to embodiments of the invention disclosed that are nevertheless still within the scope and the spirit of the invention as defined by the appended claims.

What is claimed is:

1. A method of operating a wireless device comprising:
   detecting selection of a first device through an interface of the wireless device;
   detecting selection of an interface element, of the interface of the wireless device, to be used to initiate an operational function of the first device;
   responsive to detecting selection of the interface element to be used to initiate the operation function of the first device, receiving first control data associated with the first device via a 2.4 GHz frequency band, using a radio frequency (RF) transceiver of the wireless device;
   storing the first control data in a memory of the wireless device;
   detecting selection of the operational function of the first device through the interface element of the wireless device;
   using a processor of the wireless device, accessing the memory for control data, of the first control data, corresponding to the operational function; and
   transmitting the control data corresponding to the operational function to control the first device.

2. The method of claim 1, wherein the receiving of the first control data associated with the first device includes receiving the first control data from a remote computer through a set top box.

3. The method of claim 1, wherein the detecting the selection of the first device includes detecting input to select at least one of a device type, a device vendor, and a device model of the first device.

4. The method of claim 1, wherein the receiving the first control data associated with the first device includes receiving first control data corresponding to a plurality of operational functions of the first device.

5. The method of claim 1, wherein the first control data includes one or more command codes used by the wireless device to control the first device and the transmitting the control data includes transmitting the control data using an infrared transmitter of the wireless device.

6. The method of claim 1, further comprising:
   receiving a software upgrade using the RF transceiver; and
   responsive to the processor executing an upgraded software, transmitting the control data corresponding to the function to control the first device.

7. The method of claim 1, further comprising:
   detecting input, to select a second device, through the interface of the wireless device;
   receiving second control data associated with the second device using the RF transceiver of the wireless device;

storing the second control data in the memory of the wireless device;

detecting selection of an operational function of the second device through the interface of the wireless device;

using the processor of the wireless device, accessing the memory for control data, of the second control data, corresponding to the operational function of the second device; and transmitting the control data of the second control data corresponding to the operational function of the second device, using an infrared transmitter of the wireless device, to control the second device.

8. An apparatus, comprising:

an interface configured to receive input indicating a first device, the interface comprising an interface element selectable by a user to indicate that the interface element is to be used to select an operational function of the first device;

a wireless transceiver, based a selection of the interface element by the user, configured to request and then receive first command information associated with the first device via a 2.4 GHz frequency band;

a memory device configured to store the first command information, the interface further configured to indicate an operational function of the first device, a processor, responsive to the indication of the operational function, configured to access the memory device for command information, of the first command information, corresponding to the operational function; and an infrared (IR) transmitter configured to transmit the command information corresponding to the operational function.

9. The apparatus of claim 8, wherein the interface is configured to receive input indicating at least one of a device type, a device vendor, and a device model of the first device.

10. The apparatus of claim 8, wherein the first command information corresponds to a plurality of operational functions of the first device.

11. The apparatus of claim 8, wherein the first command information includes at least one of one or more command codes to control the first device and one or more signaling protocols associated with the first device.

12. A wireless device, comprising:

an interface structure configured to receive input to select remote devices and to select buttons to be used to initiate functions of selected remote devices;

a wireless receiver configured to receive, through a 2.4 GHz frequency band, control data corresponding to the functions responsive to selection of the buttons to be used to initiate the functions and configured to receive an update to a firmware of the wireless device;

a memory device configured to store the control data and the update to the firmware;

a processor configured to operate based on the update to the firmware, wherein responsive to button input to select a function of one of the selected remote devices, the processor is configured to access the memory device for the control data corresponding to the selected function; and a wireless transmitter configured to transmit the control data corresponding to the selected function to control the one of the selected remote devices.

13. The wireless device of claim 12, wherein the input to select the remote devices includes input to select at least one of a device type, a device vendor, and a device model of a remote device.

14. The wireless device of claim 12, wherein a device type of the remote devices includes at least one of a media device and a household appliance.

15. The wireless device of claim 12, wherein a device type of the remote devices includes at least one of a video device, an audio device, a fan, a window blind, and a lighting device.

16. The wireless device of claim 12, wherein the interface structure comprises a plurality of buttons.

17. The wireless device of claim 12, wherein the control data corresponding to the functions of the selected remote devices includes infrared command codes.

18. The wireless device of claim 12, wherein the wireless receiver comprises a radio frequency receiver.

19. The wireless device of claim 12, wherein the wireless transmitter comprises an infrared transmitter.

* * * * *